US010328655B2

(12) United States Patent
Erdie et al.

(10) Patent No.: US 10,328,655 B2
(45) Date of Patent: Jun. 25, 2019

(54) PAPER-BASED ELONGATE STRUCTURES SUITABLE FOR USE AS LUMBER SUBSTITUTES

(71) Applicant: ERDIE END CAPS, LLC, Lorain, OH (US)

(72) Inventors: Jason S. Erdie, Richfield, OH (US); William P. Holbrook, Elmore, OH (US)

(73) Assignee: Erdie End Caps, LLC, Lorain, OH (US)

( * ) Notice: Subject to any disclaimer, the term of this patent is extended or adjusted under 35 U.S.C. 154(b) by 123 days.

(21) Appl. No.: 15/522,557

(22) PCT Filed: Oct. 29, 2015

(86) PCT No.: PCT/US2015/057956
§ 371 (c)(1),
(2) Date: Apr. 27, 2017

(87) PCT Pub. No.: WO2016/069843
PCT Pub. Date: May 6, 2016

(65) Prior Publication Data
US 2017/0335559 A1 Nov. 23, 2017

Related U.S. Application Data

(60) Provisional application No. 62/206,588, filed on Aug. 18, 2015, provisional application No. 62/135,794, (Continued)

(51) Int. Cl.
*B32B 1/08* (2006.01)
*B32B 3/26* (2006.01)
(Continued)

(52) U.S. Cl.
CPC ............... *B32B 1/08* (2013.01); *A47B 13/00* (2013.01); *A47C 1/02* (2013.01); *A47C 5/005* (2013.01);
(Continued)

(58) Field of Classification Search
CPC .... B32B 1/02; B32B 1/08; B32B 3/26; B32B 3/28; B32B 29/08
See application file for complete search history.

(56) References Cited

U.S. PATENT DOCUMENTS 3,563,843 A 2/1971 Wagers et al.
3,648,959 A 3/1972 Wagner
(Continued)

*Primary Examiner* — Walter Aughenbaugh
(74) *Attorney, Agent, or Firm* — Rankin, Hill & Clark LLP

(57) ABSTRACT

Paper-based elongate structures suitable for use as lumber substitutes, articles of manufacture made thereof, kits of materials including such structures, and machines and methods for making the same. Elongate structures according to the invention include a hollow outer portion formed of corrugated fiberboard sheet material and an accordion-folded inner support formed of corrugated fiberboard sheet material. The hollow outer portion has four outer surfaces that define a rectangle when viewed in cross-section transverse to a longitudinal axis of the elongate structure. The accordion-folded inner support is enclosed within the hollow outer portion. The inner support includes a plurality of first spaced-apart peaks that contact a first inner surface of the hollow outer portion and a plurality of second spaced-apart peaks that contact an opposing second inner surface of the hollow outer portion. The accordion-folded inner support structure improves the beam strength, crush resistance and lateral strength of the elongate structure.

18 Claims, 6 Drawing Sheets

Related U.S. Application Data filed on Mar. 20, 2015, provisional application No. 62/072,746, filed on Oct. 30, 2014.

(51) Int. Cl.

| | |
|---|---|
| *B32B 29/08* | (2006.01) |
| *B32B 3/28* | (2006.01) |
| *B32B 1/02* | (2006.01) |
| *B31F 1/00* | (2006.01) |
| *E02D 19/00* | (2006.01) |
| *A47B 13/00* | (2006.01) |
| *A47C 1/02* | (2006.01) |
| *A47C 5/00* | (2006.01) |
| *A47F 5/11* | (2006.01) |
| *A63B 67/06* | (2006.01) |
| *A63H 33/00* | (2006.01) |
| *B31D 5/04* | (2017.01) |
| *B65D 19/00* | (2006.01) |
| *E04B 1/26* | (2006.01) |
| *E04C 3/12* | (2006.01) |

(52) U.S. Cl.
CPC ............... *A47F 5/11* (2013.01); *A63B 67/06* (2013.01); *A63H 33/008* (2013.01); *B31D 5/04* (2013.01); *B31F 1/00* (2013.01); *B31F 1/0006* (2013.01); *B32B 1/02* (2013.01); *B32B 3/26* (2013.01); *B32B 3/28* (2013.01); *B32B 29/08* (2013.01); *B65D 19/0004* (2013.01); *E02D 19/00* (2013.01); *E04B 1/2604* (2013.01); *E04C 3/12* (2013.01); *E04B 2001/264* (2013.01)

(56) References Cited

U.S. PATENT DOCUMENTS

| | | |
|---|---|---|
| 4,488,496 A | 12/1984 | Polacco |
| 4,619,365 A | 10/1986 | Kelly et al. |
| 5,520,982 A | 5/1996 | Grigsby et al. |
| 2004/0045486 A1 | 3/2004 | Pistner et al. |

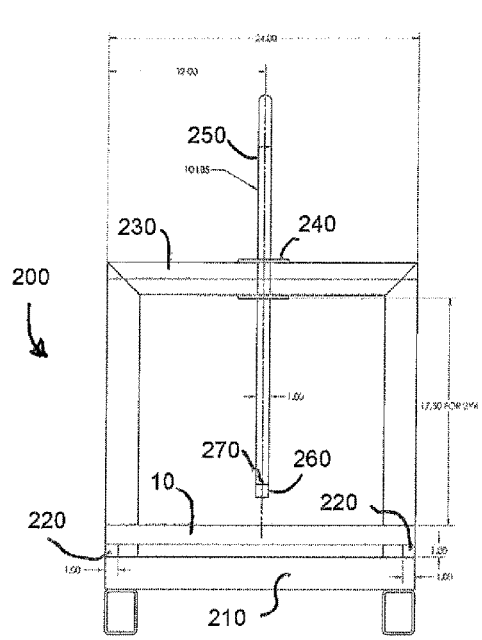
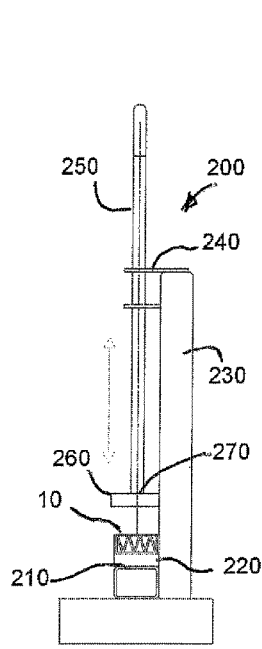
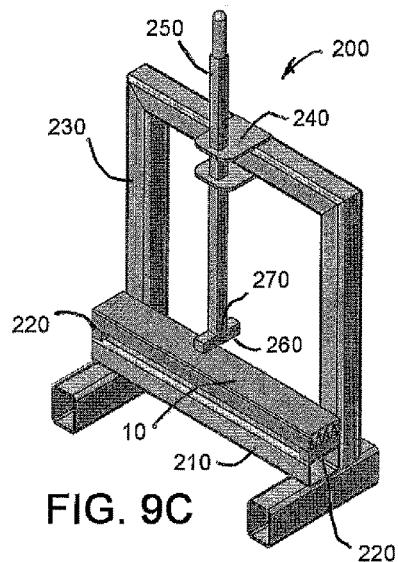
FIG. 9A  FIG. 9B  FIG. 9C
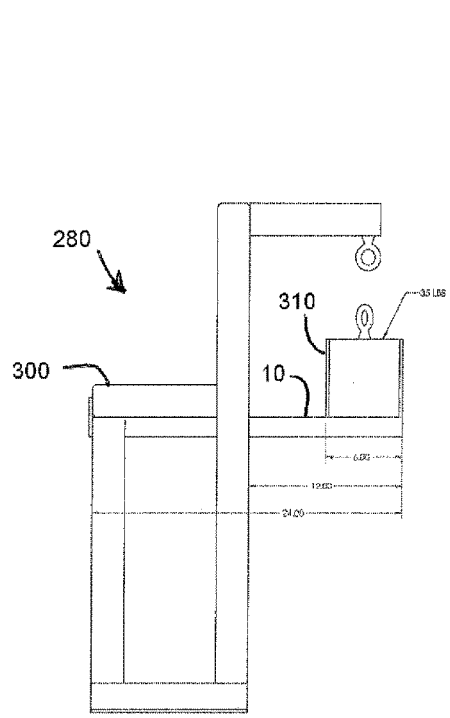
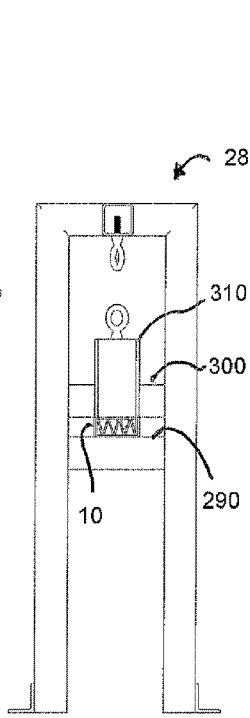
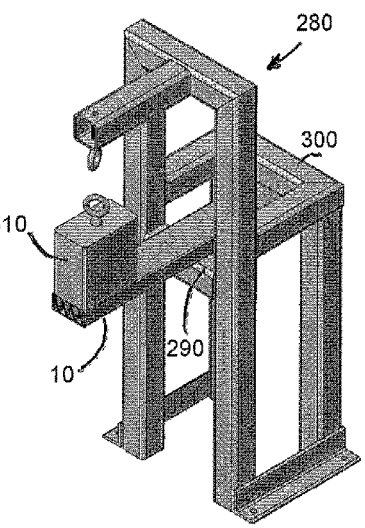
FIG. 10A  FIG. 10B  FIG. 10C

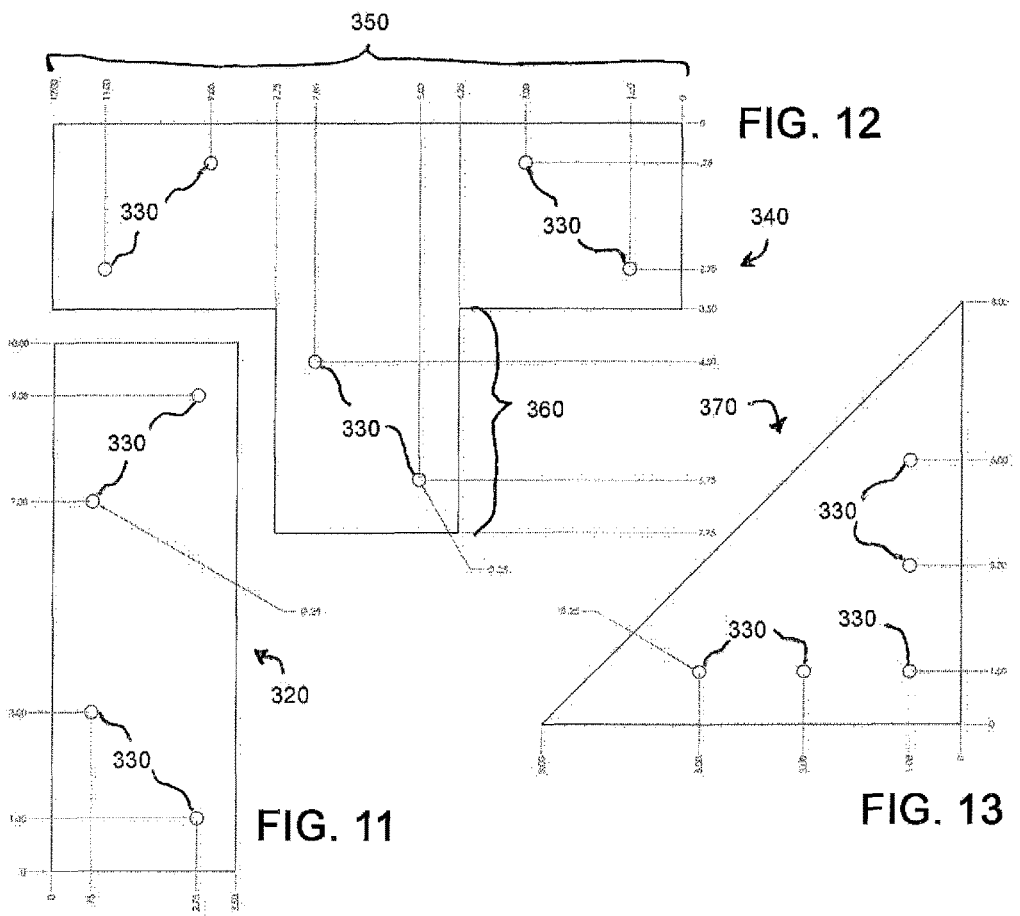
FIG. 12
FIG. 11
FIG. 13
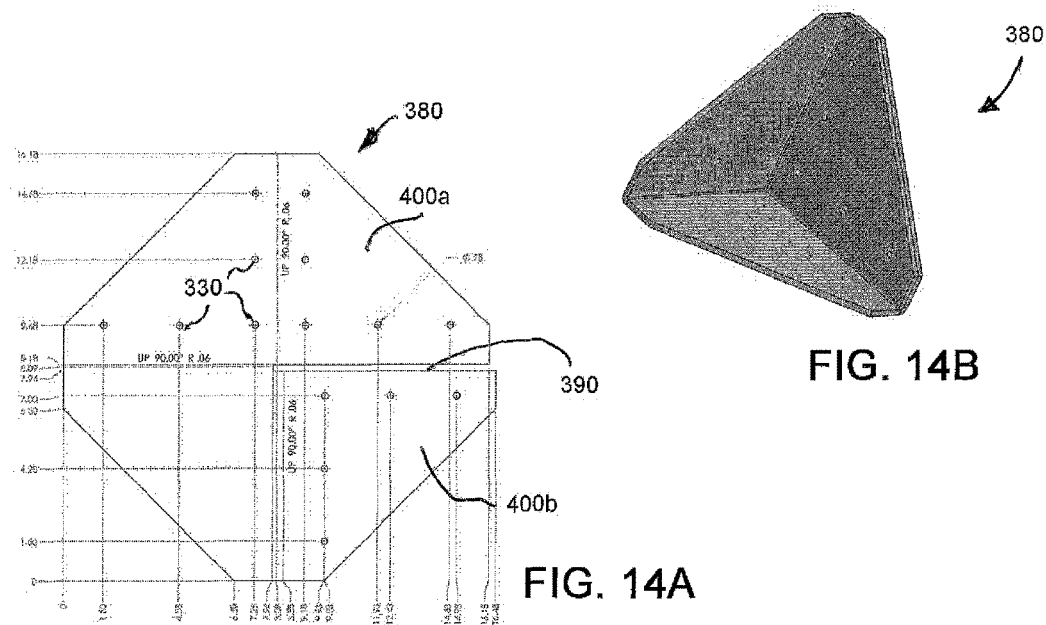
FIG. 14A
FIG. 14B

PAPER-BASED ELONGATE STRUCTURES SUITABLE FOR USE AS LUMBER SUBSTITUTES

BACKGROUND OF INVENTION

Field of Invention

The present invention relates to paper-based elongate structures suitable for use as lumber substitutes, articles of manufacture made thereof, kits of materials including such structures, and machines and methods for making the same.

Brief Description of Related Art

The present applicant is the owner of U.S. Pat. No. 8,459,190 B2, which is hereby incorporated by reference in its entirety. Such patent discloses elongate structures, which can be fabricated from paper-based materials such as corrugated fiberboard, and which can be used for a variety of applications including, but not limited to, lumber substitutes in some applications (e.g., as pallet runners). Such elongate structures are extraordinarily strong, yet are lightweight and can be fabricated on-site on an as-needed basis by hand or, more preferably using machines such as disclosed in co-pending U.S. application Ser. No. 13/765,482 (see Pub. No. US 2013/0157832 A1), which is also hereby incorporated by reference in its entirety.

BRIEF SUMMARY OF THE INVENTION

The present invention relates to paper-based elongate structures suitable for use as lumber substitutes, articles of manufacture made thereof, kits of materials including such structures, and machines and methods for making the same. Elongate structures according to the invention comprise a hollow outer portion formed of corrugated fiberboard sheet material and an accordion-folded inner support formed of corrugated fiberboard sheet material. The hollow outer portion has four outer surfaces that define a rectangle when viewed in cross-section transverse to a longitudinal axis of the elongate structure. The accordion-folded inner support is enclosed within the hollow outer portion. The inner support includes a plurality of first spaced-apart peaks that contact a first inner surface of the hollow outer portion and a plurality of second spaced-apart peaks that contact an opposing second inner surface of the hollow outer portion. In one embodiment, the hollow outer portion and the accordion-folded inner support are formed of separate and distinct pieces of corrugated fiberboard sheet material. In another embodiment, the hollow outer support and the accordion-folded inner support are integrally formed from one piece of corrugated fiberboard sheet material. In some embodiments, at least a portion of the first peaks are adhesively joined to the first inner surface and/or at least a portion of the second peaks are adhesively joined to the second inner surface. Preferably, the rectangle of the elongate structures according to the invention (when viewed in cross-section transverse to the longitudinal axis) has a thickness that is equivalent to minimum dressed dry dimension lumber having a nominal inch thickness of 2, 2½, 3, 3½, 4 or 4½, and a width that is equivalent to minimum dressed dry dimension lumber having a nominal inch width of 2, 2½, 3, 3½, 4, 4½, 5, 6, 8, 10, 12, 14 or 16, both as set forth in Table 3 of Voluntary Product Standard PS 20-15, American Softwood Lumber Standard, U.S. Department of Commerce, National Institute of Standards and Technology, effective April 2015. The accordion-folded inner support structure improves the beam strength, crush resistance and lateral strength of the elongate structure.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that:

FIGS. 9A-9C and 10A-10C show devices for testing the properties of elongate structures according to the invention.

FIG. 11 shows a straight gusset.

FIG. 12 shows a T-gusset.

FIG. 13 shows a triangle gusset.

FIGS. 14A and 14B show a three-corner gusset.

DETAILED DESCRIPTION OF THE INVENTION

Figure 1:
FIG. 1 is top plan view of an exemplary elongate structure according to the invention.

FIG. 1 is top plan view of an exemplary elongate structure 10 according to the invention. The elongate structure 10 is in the form of a beam, which has a longitudinal axis 20.

Figure 2:
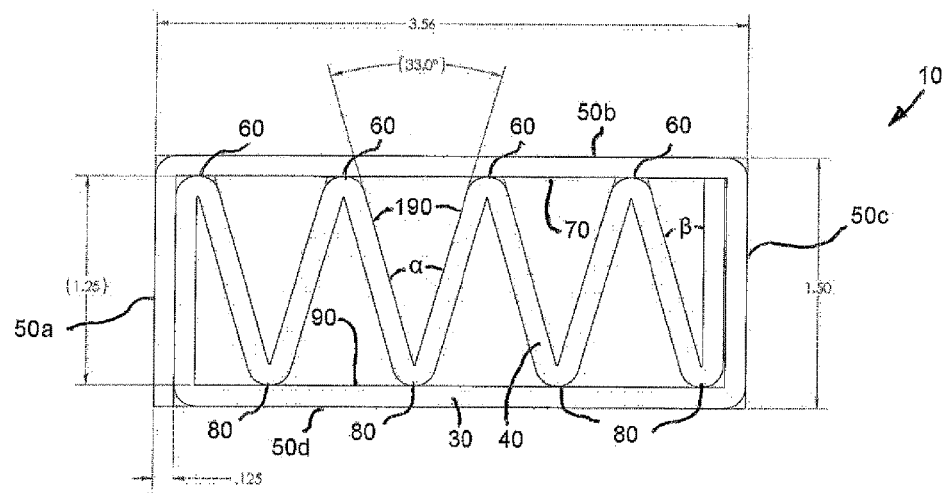
FIG. 2 is a cross-sectional view taken through the elongate structure of FIG. 1 at II-II.

With reference to FIG. 2, which is a cross-sectional view taken through the elongate structure 10 of FIG. 1 at II-II, the elongate structure 10 comprises a hollow outer portion 30 formed of corrugated fiberboard sheet material and an accordion-folded inner support 40 formed of corrugated fiberboard sheet material. The hollow outer portion 30 has four outer surfaces 50*a*, 50*b*, 50*c*, 50*d*, that define a rectangle when the elongate structure 10 is viewed in cross-section transverse to the longitudinal axis 20. The accordion-folded inner support 40 is enclosed within the hollow outer portion 30. The inner support 40 includes a plurality of first spaced-apart peaks 60 that contact a first inner surface 70 of the hollow outer portion 30 and a plurality of second spaced-apart peaks 80 that contact an opposing second inner surface 90 of the hollow outer portion 30.

Figure 3:
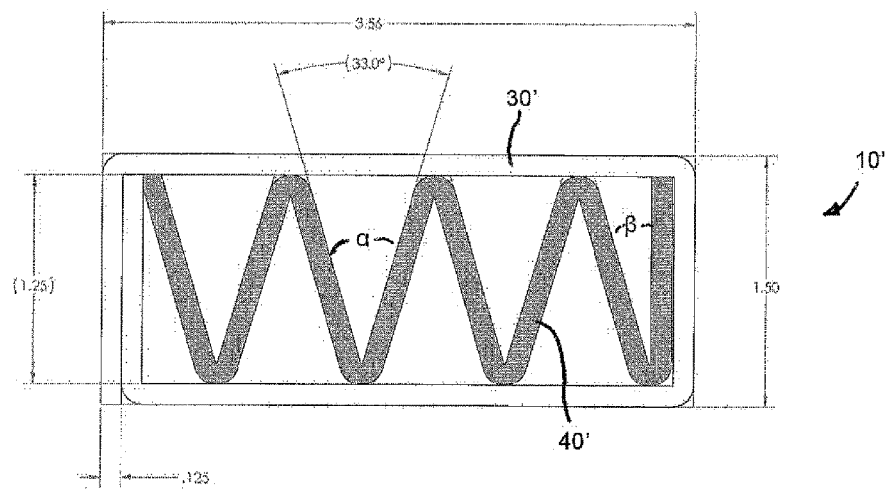
FIG. 3 is a cross-sectional view taken through an alternative embodiment of an elongate structure according to the invention.

Preferably, the hollow outer support 30 and the accordion-folded inner support 40 are integrally formed from one piece of corrugated fiberboard sheet material (e.g., as shown in FIG. 2). However, it is possible to form an elongate structure 10' in which the hollow outer portion 30' and the accordion-folded inner support 40' are formed of separate and distinct pieces of corrugated fiberboard sheet material (e.g., as shown in FIG. 3).

Figure 4:
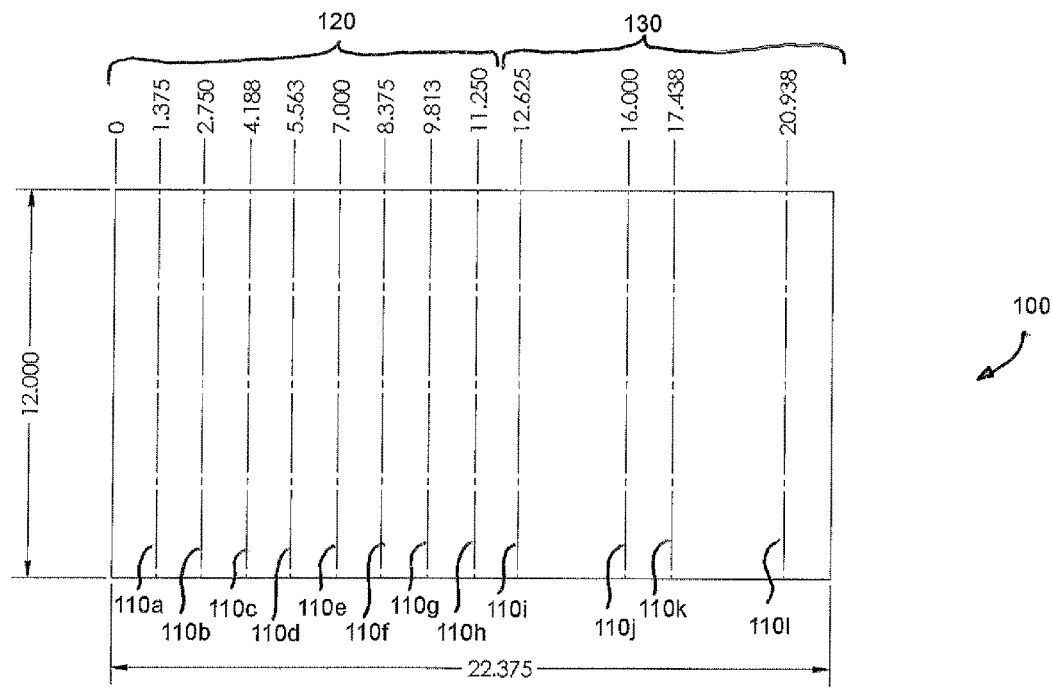
FIG. 4 is a top plan view of a blank prior to being folded to form the elongate structure of FIGS. 1 and 2.

FIG. 4 shows a substantially flat blank 100 of corrugated fiberboard sheet material that includes a plurality of creases 110a-110l that define fold lines. Creases 110a-110h are in a first portion 120 of the blank 100, which is used to form the accordion-folded inner support 40. Creases 110i-110l are in a second portion 130 of the blank 100, which is used to form the hollow outer support 30 that encloses the accordion-folded inner support 40.

The blank 100 can be folded by hand to create an elongate structure 10 according to the invention. However, it is more expedient to form the elongate structure 10 using a method and machine according to the invention. In one embodiment, the method of the invention comprises providing the substantially flat blank 100 formed of corrugated fiberboard that includes the plurality of creases 110a-110l that define fold lines, folding the first portion 120 of the blank 100 on fold lines 110a-110h to form the accordion-folded inner support 40, and folding the second portion 130 of the blank 100 on fold lines 110i-110l to form the hollow outer portion 30 such that the accordion-folded inner support 40 is enclosed within the hollow outer portion 30.

An adhesive (e.g., a fast-setting glue, double-sided adhesive tape, hot melt adhesives etc.) is preferably applied during fabrication such that at least a portion of the first peaks 60 are adhesively joined to the first inner surface 70 and/or at least a portion of the second peaks 80 are adhesively joined to the second inner surface 90. More preferably, an adhesive is applied at all points of contact between the corrugated fiberboard used to fabricate the elongate structure 10 including, but not limited to, both lap joints 140, one of which being where the accordion-folded inner support 40 contacts the hollow outer support 30 after the last crease 110l, and the other of which being where the inner support contacts 40 the opposing inner side of the hollow outer portion 30.

Figure 5:
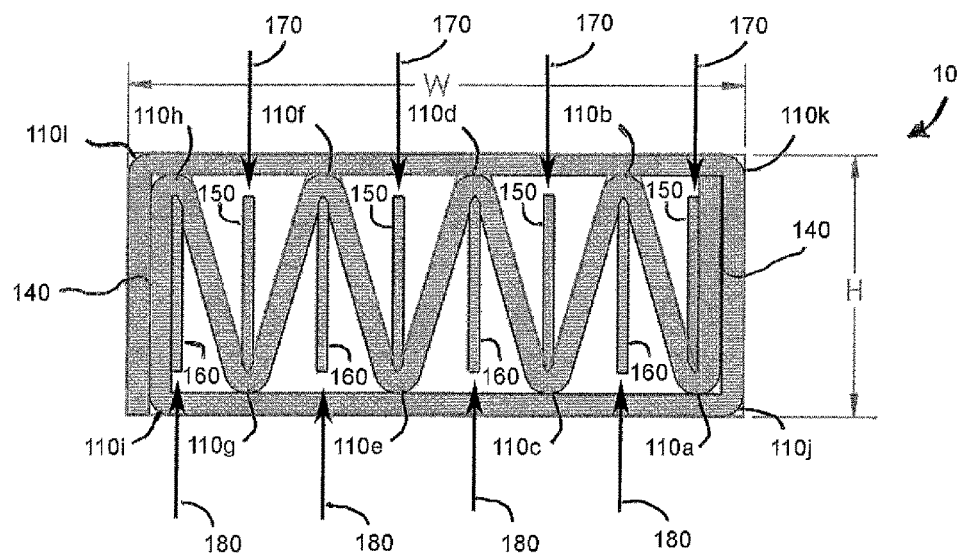
FIG. 5 is a schematic section view of a machine used to form an elongate structure.

As noted above, the elongate structure 10 is preferably manufactured using a machine according to the invention. The machine includes a pair of opposing forming fixture blades 150, 160, which press against the blank 100 from opposing sides in the directions indicated by arrows 170, 180, respectively, on the creases in the first portion 120 of the blank 100 on fold lines 110a-110h to form the accordion-folded inner support 40. It will be appreciated that the forming fixture blades 150, 160 also move closer together as they press against the blank 100 in the direction indicated by arrows 170, 180. In the schematic illustration shown in FIG. 5, the forming fixture blades 150, 160 are shown as metal bars. However, it will be appreciated that the forming fixture blades 150, 160 can take any shape that fits within the spaces between the accordion-folded inner support 40 and which can be enclosed by the hollow outer portion 30 (i.e., the forming fixture blades could be wedge-shaped or rod-shaped).

Adhesive is preferably applied to the peaks 60, 80 and the lap joint 140, either before or after the accordion-folded inner support 40 is formed by the machine. There are two ways of forming the hollow outer portion 30 such that it encloses the accordion-folded inner support 40. In a preferred embodiment, the machine includes a motor, which rotates the formed accordion-folded inner support 40 as the remaining second portion 130 of the blank 100 is folded around the accordion-folded inner support 40 to form the hollow outer portion 30. In an alternative embodiment, the machine includes a motor that moves the formed accordion-folded inner support 40 through a series of movements laterally and vertically within a forming guide, which bends the remaining second portion 130 of the blank 100 such that it folded around the accordion-folded inner support 40 to form the hollow outer portion 30. For example, with reference to FIG. 5, after the forming fixture blades 150, 160 have formed the accordion-folded inner support, the motor would move the formed according-folded inner support 40 upwardly into the forming guide, which would create the fold on crease 110h. Next, the motor would move the formed accordion-folded inner support 40 to the left further into the forming guide, which would create the fold on crease 110i. Next, the motor would move the formed accordion-folded inner support 40 downwardly further into the forming guide, which would create the fold on crease 110j. Next, the motor would move the formed accordion-folded inner support 40 to the right further into the forming guide, which would create the fold on crease 110k. Finally, the motor would move the formed accordion-folded inner support 40 upwardly into the forming guide, which would create the fold on crease 110l and press the corrugated fiberboard together at lap joint 140, thereby completing formation of the elongate structure 10. The elongate structure 10 can then be pushed off the forming fixture blades 150, 160. It will be appreciated that instead of moving the formed accordion-folded inner support 40 through a forming guide, folds at one or more of creases 110i-110l could be created by rams that move plates to create the folds. In both embodiments of a machine for forming an elongate structure according to the invention, the machine further comprises a controller operably associated with the opposing forming fixture blades and motor, which is adapted to control movement of the opposing forming fixture blades and the rotation of the accordion-folded inner support (in the first embodiment of the machine) or movement of the accordion-folded inner support through the forming guide and/or the movement of rams that move plates to create the folds (in the second embodiment of the machine).

Although elongate structures according to the invention can be formed to have virtually any desired overall dimensions (length, thickness and width), elongate structures according to the invention preferably have the same dimensions as minimum dressed dry dimension lumber having a nominal inch thickness and nominal inch width as set forth in Table 3 of Voluntary Product Standard PS 20-15, American Softwood Lumber Standard (U.S. Department of Commerce, National Institute of Standards and Technology) effective April 2015 (hereinafter "Lumber Standard"), which is hereby incorporated by reference. Thus, the hollow outer portion has four outer surfaces that define a rectangle when viewed in cross-section transverse to a longitudinal axis of the elongate structure that has a thickness that is equivalent to minimum dressed dry dimension lumber having a nominal inch thickness of 2, 2½, 3, 3½, 4 or 4½ as set forth in in the Lumber Standard, and a width that is equivalent to minimum dressed dry dimension lumber having a nominal inch width of 2, 2½, 3, 3½, 4, 4½, 5, 6, 8, 10, 12, 14 or 16 as set forth in in the Lumbers Standard.

Figure 6:
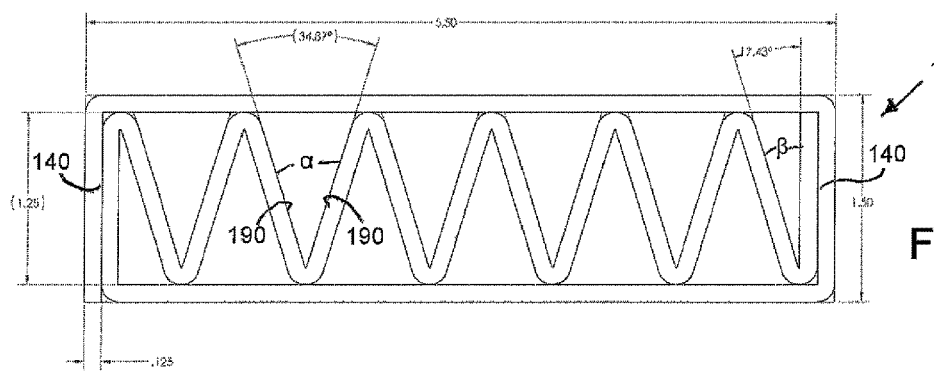
FIGS. 6-8 show alternative embodiments of elongate structures according to the invention.
Figure 7:
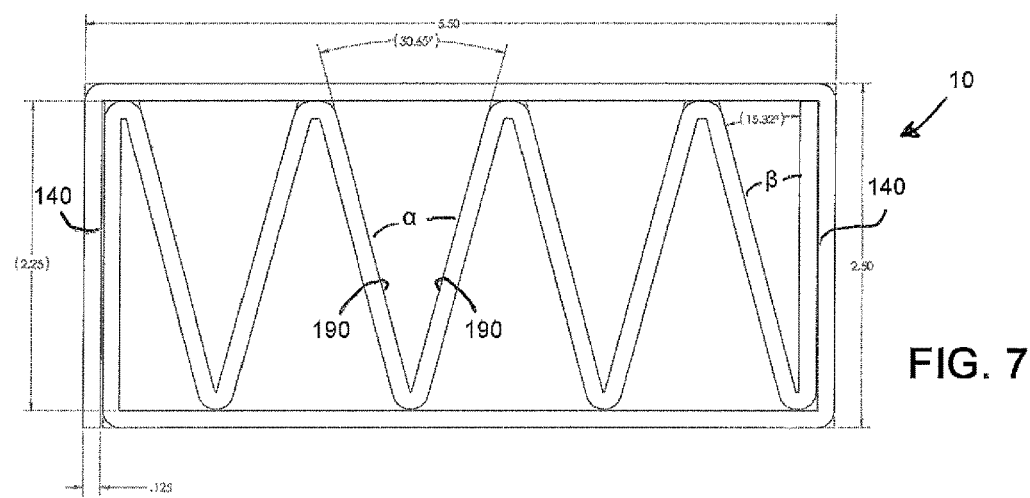
Figure 8:
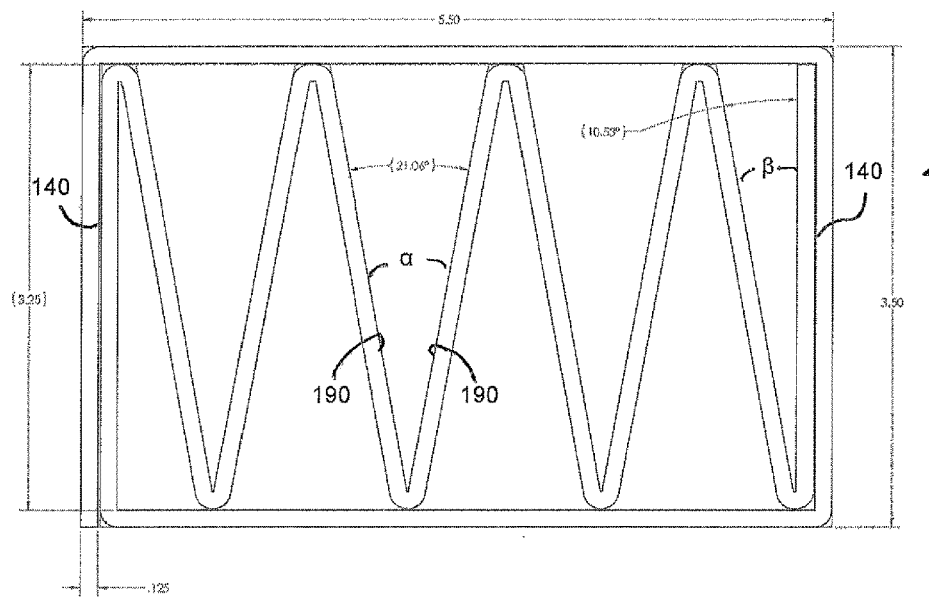

FIG. 2 includes dimensions for a 2"×4" elongate structure according to the invention that has thickness and width dimensions equivalent to a 2"×4" that meets the Lumber Standard. FIG. 6 includes dimensions for a 2"×6" elongate structure according to the invention that has thickness and width dimensions equivalent to a 2"×6" that meets the Lumber Standard. FIG. 7 includes dimensions for a 3"×6 elongate structure according to the invention that has thickness and width dimensions equivalent to a 3"×6" that meets the Lumber Standard. And, FIG. 8 includes dimensions for a 4"×6" elongate structure according to the invention that has thickness and width dimensions equivalent to a 4"×6" that meets the Lumber Standard.

It should be noted that in FIG. 2, the angle α between adjacent panels 190 of the accordion-folded inner support 40 intersect at an angle of about 33.0° in six instances. In FIG. 6, the angle α between adjacent panels 190 of the accordion-folded inner support 40 intersect at an angle of about 34.87° in ten instances. In FIG. 7, the angle α between adjacent panels 190 of the accordion-folded inner support 40 intersect at an angle of about 30.65° in six instances. And, in FIG. 8, the angle α between adjacent panels 190 of the accordion-folded inner support 40 intersect at an angle of about 21.06° in six instances. It will be appreciated that the angle β, being defined between the last angular panel of the inner support and the vertical panel adjacent to the lap joints, will be roughly half the angle α.

The properties of corrugated fiberboard are far different than a linear elastic material like a metal, so the strength of an elongate structure formed of folded and glued corrugated fiberboard is difficult to predict or model. However, applicant has observed that strong elongate structures can be obtained when the elongate structure exhibits a profile ratio of 3.37±20%. To calculate the profile ratio, one must first calculate the circumference of the cross-section of the elongate structure (CS), which is two times the actual height (H) plus two times the actual width (W), then calculate the area of the fiberboard blank (BA) in inches (as viewed from the edge of the blank parallel to the creases), and then divide the circumference of the elongate structure (CS) by the area of the blank (BA). The structural profile ratio for the embodiments shown in FIGS. 2 and 6-8 is shown in Table I below:

TABLE 1

| Figure | Nominal (H × W) | Actual H (inches) | Actual W (inches) | Circumference (inches) (CS) | Blank Thickness (inches) | Blank Width (inches) | Blank Area (BA) | Ratio (CS/BA) |
|---|---|---|---|---|---|---|---|---|
| 2 | 2 × 4 | 1.5 | 3.5 | 10 | 0.125 | 22.38 | 2.80 | 3.58 |
| 6 | 2 × 6 | 1.5 | 5.5 | 14 | 0.125 | 32.00 | 4.00 | 3.50 |
| 7 | 3 × 6 | 2.5 | 5.5 | 16 | 0.125 | 37.50 | 4.69 | 3.41 |
| 8 | 4 × 6 | 3.5 | 5.5 | 18 | 0.125 | 48.50 | 6.06 | 2.97 |

FIGS. 9A, 9B and 9C show a front plan view, a side plan view and a perspective view, respectively, of a first testing apparatus 200 created by applicant for ascertaining whether elongate structures having a nominal 2×4 dimension exhibit acceptable strength from blunt force impact. The first testing apparatus 200 includes a base 210 with two elevated stages 220 for supporting an elongate structure 10 in a lateral orientation. The elevated stages 220 are one inch wide and one inch high and 3.5 inches long, and are spaced apart such that their farthest edges are 24 inches apart. The elevated stages 220 create a space or gap between the elongate structure 10 and the base 210 of the first testing apparatus 200. The first testing apparatus 200 also includes an arched portion 230 that includes a guide 240 for slidingly receiving a vertical rod 250. An impact bar 260 measuring one inch wide and one inch high and 3.5 inches in length is attached to the lower end 270 of the vertical rod 250. The vertical rod 250 can be lifted such that the top side of the impact bar 260 is 17.50 inches from the top of the elongate structure 10 supported on the two elevated stages 220. The total weight of the impact bar 260 and vertical rod 250 is 10 pounds.

Impact testing is accomplished by dropping the vertical rod 260 from its highest lifted point such that the impact bar 260 under the force of gravity accelerates and then impacts the elongate structure 10 at the mid-point between the two elevated stages 220. An elongate structure 10 is deemed to have sufficient strength if it remains straight after impact. Elongate structures according to FIGS. 2 and 3 remain straight (undamaged) when tested using the first testing apparatus 200. It will be appreciated that various parameters of the first testing apparatus 200 can be changed to evaluate elongate structures of different dimensions (e.g., the area of the bottom of the impact bar, the length of travel of the vertical rod, the total weight of the vertical rod and impact bar and the spacing between the elevated stages). The dimensions and weights indicated in FIGS. 9A-9C are exemplary, and were selected for an elongate structure having a nominal 2×4 dimension.

FIGS. 10A, 10B and 100 show side plan view, a front plan view and a perspective view, respectively, of a second testing apparatus 280 created by applicant for ascertaining whether elongate structures having a nominal 2×4 dimension exhibit acceptable resistance to deformation over time. The second testing apparatus 280 includes a fulcrum 290 and a rear arrest 300. An elongate structure 10 having a length of 24 inches is positioned such that one end is beneath the rear arrest 300 and the midpoint of the elongate structure 10 is supported on the fulcrum 290. Other designs are possible, including simply a 12-inch deep cavity. What is important is that exactly 12 inches of the elongate structure 10 is unsupported horizontally beyond the fulcrum 290. A weight 310 is gently lowered onto the exposed end of the elongate structure 10. The base of the weight 310 covers the last 6 inches of the elongate structure (i.e., the weight covers an area 3.5 inches wide and 6 inches long). The weight 310 weighs 35 pounds.

An elongate structure 10 is deemed to have sufficient resistance to deformation if it remains straight (i.e., does not bend) after supporting the weight 310 for a period of time of twenty-four hours. Elongate structures according to FIGS. 2 and 3 remain straight (unbent) when tested using the second testing apparatus 280. It will be appreciated that various parameters of the second testing apparatus 280 can be changed to evaluate elongate structures of different dimensions (e.g., the area of the bottom of the weight, the length of the elongate structure extending beyond the fulcrum, the weight of the weight and the period of time during which the elongate structure must support the weight). The dimensions and weights indicated in FIGS. 10A-10C are exemplary, and were selected for an elongate structure having a nominal 2×4 dimension.

As noted above, the elongate structures according to the invention are preferably formed of corrugated fiberboard material. The corrugated fiberboard material can optionally be coated or treated to affect certain properties of the elongated structure. For example, the corrugated material can be coated with a water-repellant treatment to improve water degradation resistance. The corrugated fiberboard material can be subjected to an ink-receptive treatment, which improves the ability of the elongated structures to be printed. The elongate structures can be formed from single plies of corrugated fiberboard material, or can be formed from multiple plies. Various thicknesses of corrugated fiberboard can also be used.

Elongate structures according to the invention can be formed in virtually any length. However, for expediency and convenience, the elongate structures are preferably formed into standard lengths (e.g., 1 foot, 18 inches, 24 inches, 36 inches, 48 inches, 72 inches and 96 inches). The elongate structures can be cut using power equipment and tools used to cut conventional dimensional lumber (e.g., circular saws, jigsaws, hand saws). The elongate structures can be mitered to form adjoining corners of any angle. They can also be cut using knives or other cutting instruments.

Elongate structures according to the invention can be joined to each other or to other materials such as panels of corrugated fiberboard using adhesives and fasteners. FIG. 11 shows a straight gusset 320, which allows two elongate structures to be joined end to end. Preferably, two straight gussets are utilized when elongate structures are joined end to end, one on each side of the joint. The straight gusset 320 may include a plurality of holes 330. Alternatively, the straight gusset 320 may include markings that indicate where fasteners should be utilized.

FIG. 12 shows a T-gusset 340, which can be utilized to joint two or three elongate structures together. When the T-gusset 340 is used to join two elongate structures together, the top portion 350 of the T-gusset 340 covers a one elongate structure (any portion thereof), and the lower portion 360 covers an end of the second elongate structure, which abuts against a side of the first elongate structure. When the T-gusset 340 is used to join three elongate structures together, two elongate structures either abut end to end beneath the top portion 350 and the third elongate structure abuts against them while being covered by the lower portion 360 of the T-gusset, or the ends of two elongate structures are covered by opposing end portions of the top portion 350 of the T-gusset and abut opposing sides of an elongate structure that is covered by the lower portion 360 but extends into the upper portion. Again, preferably two T-gussets are utilized, when possible, one on either side of the elongate structures being joined together.

FIG. 13 shows a triangle-gusset 370, which can be used to join two elongate structures at a 90° angle. The two elongate structures can abut with an end of one elongate structure touching a side of the other elongate structure. Or, the ends can be mitered at 45° to form the 90° corner. Again, preferably two triangle-gussets 370 are used at a corner, one on either side of the elongate structures being joined together.

Other shapes and types of gussets can be used. For example, gussets having the shape of a plus sign ("+") can be used to join three or four elongate structures together at 90°. Gussets can be formed to join elongate structures together at angles other than 90°. Gussets can be made of several plies of corrugated fiberboard (or other material), and can be affixed to the elongate structures using adhesives and/or fasteners.

FIGS. 14A and 14B show a particularly strong corner gusset 380, which includes a slot 390 that allows the gusset 380 to be folded into a corner shape when panel 400a is folded to be covered by panel 400b. The corner gusset 380 allows three elongate structures to be joined together from three coordinate directions (X, Y and Z).

A variety of fasteners can be used to join elongate structures together with or without gussets. Suitable fasteners include nails, brads, staples, screws, and hook-and-loop fasteners (e.g. VELCRO). Washers (e.g., plastic washers) can also be used to widen the area of contact between the head of the fastener and the corrugated fiberboard adjacent to the hole of the shank(s) of the fastener. Particularly suitable fasteners are ribbed shank plastic rivets, which are widely available. Adhesives such as hot melt glue, cold glues, adhesive tapes etc. can be used alone or with fasteners to ensure a strong joint. Elongate structures can be joined to materials other than corrugated fiberboard including, for example, dimensional lumber and other building materials.

Figure 15A:
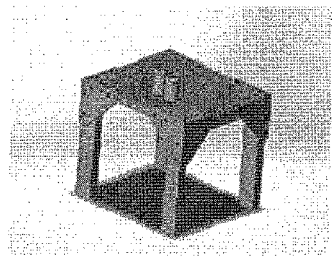
FIGS. 15A-15I show exemplary articles that can be manufactured using elongate structures and gussets according to the invention.
Figure 15B:
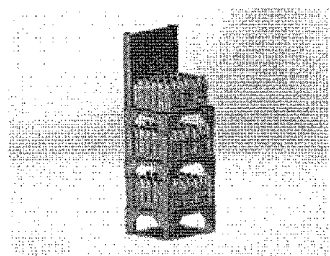
Figure 15C:
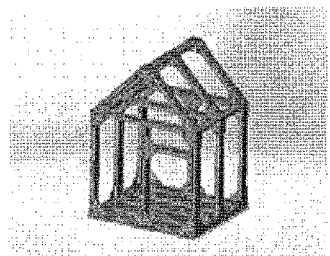
Figure 15D:
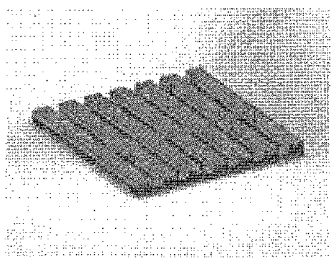
Figure 15E:
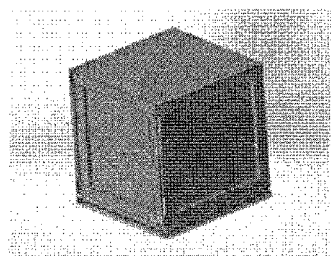
Figure 15F:
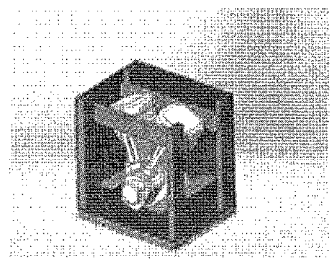
Figure 15G:
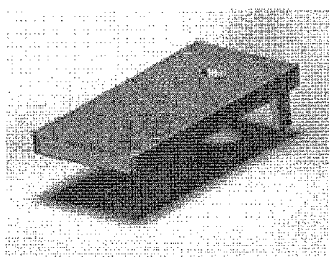
Figure 15H:
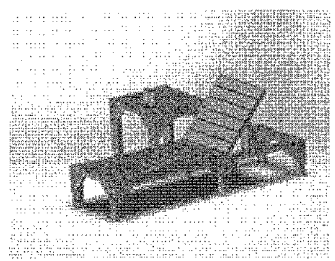
Figure 15I:
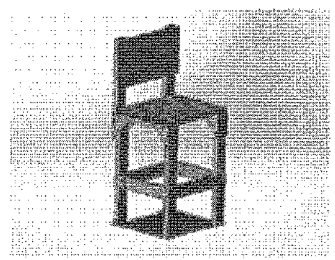

FIGS. 15A-15i show various exemplary articles and structures that can be formed using elongate structures according to the invention, gussets and other materials. For example, FIG. 15A shows an exemplary table. FIG. 15B shows an exemplary display stand. FIG. 15C shows an exemplary children's play house. FIG. 15D shows an exemplary shipping pallet. FIG. 15E shows an exemplary shipping crate. FIG. 15F shows an exemplary export box. FIG. 15G shows an exemplary toss game. FIG. 15H shows an exemplary reclining chair and table set. FIG. 15I shows an exemplary table. The various components of such articles and structures can be supplied as a kit of materials (e.g., a kit containing the gussets, instructions and fasteners), with the elongate structures either being supplied as part of the kit or sold separately.

Pallets formed of elongate structures according to the invention are strong, yet light in weight (at least ⅓ the weight of similar dimensioned pallets made of wood). They can be fabricated at the shipping site, and reused or recycled with other fiberboard materials at the shipping destination. The reduction in weight saves shipping weight, which reduces freight costs and fuel consumption.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An elongate structure comprising:
   a hollow outer portion formed of corrugated fiberboard sheet material; and
   an accordion-folded inner support formed of corrugated fiberboard sheet material;
   wherein the hollow outer portion has four outer surfaces that define a rectangle when viewed in cross-section transverse to a longitudinal axis of the elongate structure,
   wherein the accordion-folded inner support is enclosed within the hollow outer portion,
   wherein the inner support includes a plurality of first spaced-apart peaks that contact a first inner surface of the hollow outer portion and a plurality of second spaced-apart peaks that contact an opposing second inner surface of the hollow outer portion.

2. The elongate structure according to claim 1, wherein the hollow outer portion and the accordion-folded inner support are formed of separate and distinct pieces of corrugated fiberboard sheet material.

3. The elongate structure according to claim 1, wherein the hollow outer support and the accordion-folded inner support are integrally formed from one piece of corrugated fiberboard sheet material.

4. The elongate structure according to claim 1, wherein at least a portion of the first peaks are adhesively joined to the first inner surface and/or at least a portion of the second peaks are adhesively joined to the second inner surface.

5. The elongate structure according to claim 1, wherein the rectangle has:
a thickness that is equivalent to minimum dressed dry dimension lumber having a nominal inch thickness of 2, 2½, 3, 3½, 4 or 4½ as set forth in Table 3 of Voluntary Product Standard PS 20-15, American Softwood Lumber Standard (U.S. Department of Commerce, National Institute of Standards and Technology) effective April 2015, and
a width that is equivalent to minimum dressed dry dimension lumber having a nominal inch width of 2, 2½, 3, 3½, 4, 4½, 5, 6, 8, 10, 12, 14 or 16 as set forth in Table 3 of Voluntary Product Standard PS 20-15, American Softwood Lumber Standard (U.S. Department of Commerce, National Institute of Standards and Technology) effective April 2015.

6. The elongate structure according to claim 1, wherein the rectangle has:
a thickness that is equivalent to minimum dressed dry dimension lumber having a nominal inch thickness of 2 as set forth in Table 3 of Voluntary Product Standard PS 20-15, American Softwood Lumber Standard (U.S. Department of Commerce, National Institute of Standards and Technology) effective April 2015, and
a width that is equivalent to minimum dressed dry dimension lumber having a nominal inch width of 4 as set forth in Table 3 of Voluntary Product Standard PS 20-15, American Softwood Lumber Standard (U.S. Department of Commerce, National Institute of Standards and Technology) effective April 2015.

7. The elongate structure according to claim 6, wherein the accordion-folded inner support comprises a series of panels, and wherein adjacent panels in the series of panels, when viewed in cross-section transverse to the longitudinal axis of the elongate structure, intersect at an angle of about 33.0° in six instances.

8. The elongate structure according to claim 1, wherein the rectangle has:
a thickness that is equivalent to minimum dressed dry dimension lumber having a nominal inch thickness of 2 as set forth in Table 3 of Voluntary Product Standard PS 20-15, American Softwood Lumber Standard (U.S. Department of Commerce, National Institute of Standards and Technology) effective April 2015, and
a width that is equivalent to minimum dressed dry dimension lumber having a nominal inch width of 6 as set forth in Table 3 of Voluntary Product Standard PS 20-15, American Softwood Lumber Standard (U.S. Department of Commerce, National Institute of Standards and Technology) effective April 2015.

9. The elongate structure according to claim 8, wherein the accordion-folded inner support comprises a series of panels, and wherein adjacent panels in the series of panels, when viewed in cross-section transverse to the longitudinal axis of the elongate structure, intersect at an angle of about 34.87° in ten instances.

10. The elongate structure according to claim 1, wherein the rectangle has:
a thickness that is equivalent to minimum dressed dry dimension lumber having a nominal inch thickness of 3 as set forth in Table 3 of Voluntary Product Standard PS 20-15, American Softwood Lumber Standard (U.S. Department of Commerce, National Institute of Standards and Technology) effective April 2015, and
a width that is equivalent to minimum dressed dry dimension lumber having a nominal inch width of 6 as set forth in Table 3 of Voluntary Product Standard PS 20-15, American Softwood Lumber Standard (U.S. Department of Commerce, National Institute of Standards and Technology) effective April 2015.

11. The elongate structure according to claim 10, wherein the accordion-folded inner support comprises a series of panels, and wherein adjacent panels in the series of panels, when viewed in cross-section transverse to the longitudinal axis of the elongate structure, intersect at an angle of about 30.65° in six instances.

12. The elongate structure according to claim 1, wherein the rectangle has:
a thickness that is equivalent to minimum dressed dry dimension lumber having a nominal inch thickness of 4 as set forth in Table 3 of Voluntary Product Standard PS 20-15, American Softwood Lumber Standard (U.S. Department of Commerce, National Institute of Standards and Technology) effective April 2015, and
a width that is equivalent to minimum dressed dry dimension lumber having a nominal inch width of 6 as set forth in Table 3 of Voluntary Product Standard PS 20-15, American Softwood Lumber Standard (U.S. Department of Commerce, National Institute of Standards and Technology) effective April 2015.

13. The elongate structure according to claim 12, wherein the accordion-folded inner support comprises a series of panels, and wherein adjacent panels in the series of panels, when viewed in cross-section transverse to the longitudinal axis of the elongate structure, intersect at an angle of about 21.06° in six instances.

14. An article of manufacture comprising at least two elongate structures according to claim 1 and a gusset, wherein said gusset joins the at least two elongate structures together.

15. The article of manufacture according to claim 14, wherein the gusset is formed of corrugated fiberboard, and wherein the article of manufacture further comprises a plurality of plastic fasteners, each of which passes through the gusset and one of the at least two elongate structures.

16. The article of manufacture according to claim 15, wherein the article of manufacture is selected from a group consisting of a shipping container, a piece of furniture, a display stand and an architectural structure.

17. A kit of materials comprising:
at least two elongate structures according to claim 1;
at least one gusset; and
a plurality of fasteners.

18. A method of forming an elongate structure according to claim 3, the method comprising:
providing a substantially flat blank formed of corrugated fiberboard that includes a plurality of creases that define fold lines;
folding a first portion of the blank on fold lines to form the accordion-folded inner support; and
folding a second portion of the blank on fold lines to form the hollow outer portion such that the accordion-folded inner support is enclosed within the hollow outer portion.

* * * * *